Sept. 6, 1949.   H. S. WERTZ   2,481,458
CATHODE-RAY DEVICE
Filed Oct. 12, 1943   2 Sheets-Sheet 1

INVENTOR
H. S. WERTZ
BY
*C. N. Sprague*
ATTORNEY

Sept. 6, 1949.  H. S. WERTZ  2,481,458
CATHODE-RAY DEVICE

Filed Oct. 12, 1943  2 Sheets-Sheet 2

INVENTOR
H. S. WERTZ
BY:
ATTORNEY

Patented Sept. 6, 1949

2,481,458

UNITED STATES PATENT OFFICE 2,481,458

CATHODE-RAY DEVICE

Hugh S. Wertz, New Hyde Park, N. Y., assignor to Bell Telephone Laboratories, Incorporated, New York, N. Y., a corporation of New York Application October 12, 1943, Serial No. 505,909

6 Claims. (Cl. 250—150)

This invention relates to cathode ray devices and more specifically to devices of this character used for electrostatic recording and reproducing.

It is an object of this invention to provide improved means for the electrostatic recording and reproducing of signals.

In Patent 2,245,364, issued June 10, 1941, to R. R. Riesz and H. S. Wertz there is disclosed a cathode ray device used for the electrostatic recording and reproducing of signals. This tube comprises an envelope having two chambers with an electron gun in each chamber, the two chambers being separated by a target member containing a multiplicity of metal elements mounted in an insulating disc. A metal ring is mounted outside the insulating disc. The exposed surface of each metal element in one chamber is preferably treated with a suitable substance to discourage secondary emission while the other exposed surface is left untreated or treated so as to encourage secondary emission. The beam in one chamber is modulated with signals to be recorded while the beam in the other chamber is maintained at a constant intensity. By means of two voltage sine waves in quadrature phase relation and applied respectively to the two pairs of deflecting plates in the first chamber, the beam in that chamber is caused to sweep in a circular path over each of the conducting elements in turn, leaving each of them negatively charged. Similar sweep waves are applied to the two sets of deflecting plates in the second chamber but these waves are displaced in phase from the corresponding waves in the first chamber in order to cause a time displacement between the beam impacts upon the same conducting target element in the two chambers. Each passage of the beam in the second chamber over the conducting elements removes the charges produced by the first beam due to the fact that the second beam causes an excess of secondary electrons to be emitted. The amount of the phase displacement between the two beams and the frequency of the sweep determines the time of delay between the recording and the reproducing.

In carrying out the present invention in its preferred form, there is provided a cathode ray recording and reproducing tube using two linear sweeps rather than circular ones of the arrangement of the Riesz-Wertz patent which requires two pairs of deflecting plates for each sweep. This permits the sweep circuits to be more readily synchronized with the incoming signals and a form of target to be used which is simple and cheap to construct. If it is desired to start each sweep of the recording beam simultaneously with a pulse in the signal train to be recorded or stored, this pulse can be utilized directly to control the linear sweep circuit.

In a specific embodiment of the invention, shown and described by way of example for illustrative purposes, there is provided a tube suitable for electrostatic recording and reproducing comprising a target including a metal backing, an insulating layer, and a mosaic layer of alternate thin strips of metallic and insulating material. A first beam of electrons is deflected across the upper portion of each of the strips (this portion being treated to discourage secondary emission) in a direction transverse to the long dimension thereof to store up charges in the elemental capacities between metallic strips and the metal backing plate, while a second beam is deflected across the lower portions of the strips (which portions are left untreated or have been treated to encourage secondary emission) at a frequency which is, in one application of the device, the same as the recording frequency (but which is phase displaced from the first beam) to remove the charges. In another application of the device, the frequency of reproduction of successive similar trains of signals is made much less than the frequency of recording these trains. In this arrangement, a number of substantially similar trains of signals are stored in such a manner as to build up a single series of accumulated charges and the charges are periodically removed to produce a single train of voltage variations corresponding to the series of charges. This has the advantage of increasing the ratio between the intensity of cyclically regularly-recurring signal pulses or peaks in the incoming signal trains with respect to spurious variations which do not occur in the same position in each cycle or train of signals. It has a further advantage, in a case where a number of similar series of pulses are recorded for each reproduction, of reducing the frequency of repetition of the pulses and hence the over-all frequency band width.

In another embodiment, the target comprises alternately arranged metal and insulating strips, alternate ones of the metal strips being connected together and placed at a negative potential with respect to the final anode of the second electron gun in the tube to reduce distortion caused by secondary electrons from one elemental strip being attracted to a neighboring strip. The fixed potential strips act as a barrier to prevent this migration of electrons and cause the secondary electrons to be directed toward the collecting electrode.

The invention will be more readily understood by referring to the following description taken in connection with the accompanying drawings forming a part thereof, in which.

Figure 1:
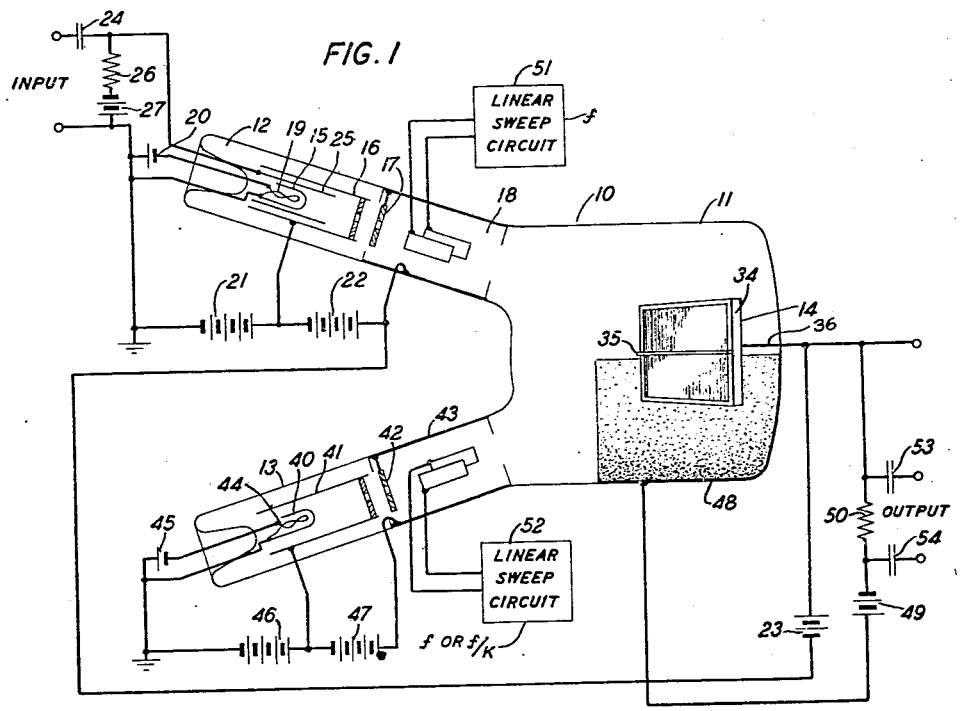
Fig. 1 is a schematic view of a cathode ray tube in accordance with this invention together with certain of its associated circuits.

Referring more particularly to the drawings, Fig. 1 shows, by way of example for illustrative purposes, a cathode ray device 10 for recording and reproducing signals or other electrical variations. The tube 10 comprises an evacuated container having a body portion 11 and two tubular portions or chambers 12 and 13 connected thereto. In each of said latter portions there is positioned an electron gun. A target 14 is mounted in the body portion 11.

Figure 3:
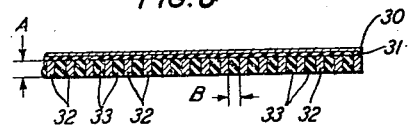
Fig. 3 is a partial cross-section view of the target shown in Fig. 2.

The tube or chamber 12 in which the recording electron beam is generated includes an electron gun comprising a cathode 15, an anode cylinder 16, an anode plate 17, and a conducting coating 18 for forming and accelerating a beam of electrons and for focusing it into a fine spot upon the composite target 14. The cathode 15 is heated by a filament 19 which is supplied with current from a source of potential 20. The anode 16 is positively biased with respect to the cathode 15 by means of a source of direct potential 21 while the anode plate 17 and the coating 18 are positively biased with respect to the anode 16 by means of a source of direct potential 22. A source of direct potential 23 may be included in circuit between the coating 18 and the metal backing plate 30 of the target 14, the purpose of which will be more fully described below. With reference to Fig. 3, the target 14 preferably comprises the metal backing plate 30 connected to output terminal member 36, a layer of mica or other suitable insulation 31, and a mosaic layer of alternate thin strips 32 and 33 of metallic and insulating material, respectively. In order to produce a minimum interstrip capacity and thus to minimize distortions which would be produced thereby, the depth of each metal strip 32 (dimension A in Fig. 3) is kept as small as possible. Moreover, the thickness of the layer 31 is preferably made small compared with the thickness of the insulating strips 33 (dimension B) to further reduce the possibility of producing harmful effects which would result from too high an interstrip capacity compared with the capacity between the strips 32 and the metal backing layer 30.

The intensity of the beam is modulated by means of incoming signals applied by means of the coupling condenser 24 between a modulating element 25 and the cathode 15. A high resistance 26 and biasing source of direct potential 27 are also included in this input circuit in the usual manner.

The reproducing tube or chamber 13 includes an electron gun comprising a cathode 40, a cylindrical anode 41, a plate anode 42, and a conducting coating 43 for forming and accelerating a beam of electrons and for focusing it into a fine spot upon lower front surface of the target or screen 14. The cathode 40 is heated by a filament 44 which is supplied with current from a source of potential 45. The cylindrical anode 41 is positively biased with respect to the cathode 40 by means of a source of direct potential 46, while the apertured plate 42 and the conducting coating 43 are placed at a positive potential with respect to the anode 41 by means of a source of potential 47. A secondary electron collecting electrode 48 is, for example, arranged in the form of a coating on a portion of the inside wall of the tube adjacent the bottom half of the target 14 and is connected to the backing plate 30 through a source of potential 49, an output resistor 50 and terminal member 36. If desired, the collecting electrode 48 may have any other well-known form.

The beam in the tube 12 is directed so that it strikes the upper half of the target 14 while the beam in the tube 13 is directed so that it strikes the lower half thereof. The target 14 is preferably encased in a plastic or other mounting 34 but clips or other means may be provided to hold the plates 32 and 33 in position if desired. In order to prevent or to discourage the migration of electrons emitted from one half of the target to the other half thereof, a shield or barrier member 35, preferably of insulating material, is provided. The portion of the target 14 above the barrier 35 is preferably coated with a substance, such as carbon, to discourage the emission of secondary electrons (thereby allowing negative charges to be formed on the metal strips when the beam in the tube 12 contacts them) while the metallic strips 32 in the lower half of the target 14 are left untreated or are coated with a substance such as an alkali metal to encourage the emission of secondary electrons (and thereby allow the charges to be removed when the beam in the tube 13 contacts the strips). It is obvious that the portion above the barrier 35 may be arranged so as to cause emission of secondary electrons and the portion below it coated to discourage the emission thereof, if desired. In this latter arrangement positive instead of negative charges are produced on the metal strips.

Figure 5:
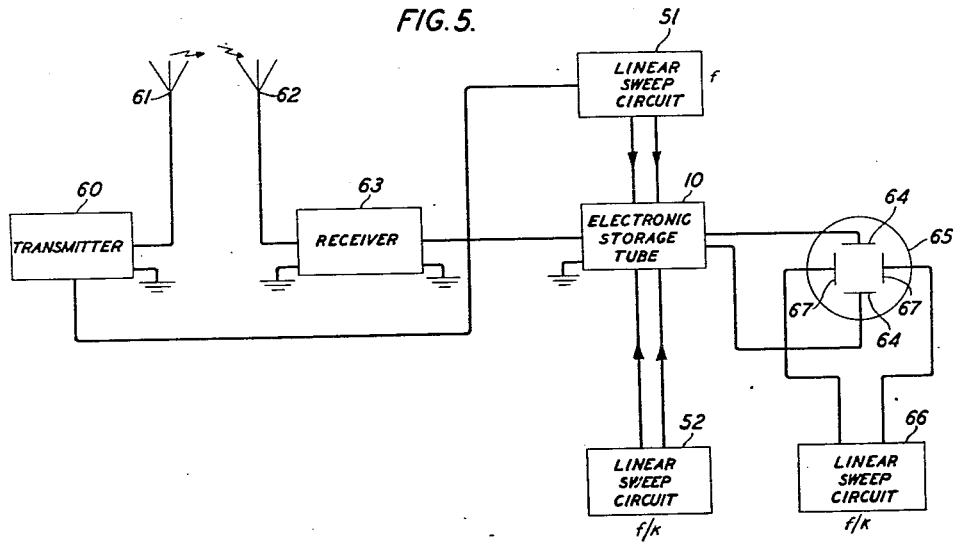
Fig. 5 is a schematic circuit diagram of a radio object-locator and distance measuring system in which a tube of the type shown in Fig. 1 can be utilized.

The beam in the tube 12 is directed across each of the strips 32 in turn, in a path transverse to the long dimensions thereof, by means of a sweep circuit 51 of any suitable form. For example, if the sweep circuit is adapted to have a substantially constant frequency, a suitable circuit is that shown in Patent 2,178,464, issued October 31, 1939, to M. W. Baldwin, Jr. If, however, each sweep is initiated by a pulse and the period between successive pulses is unequal, a suitable sweep circuit is that shown in Patent 2,351,256, issued May 6, 1941, to K. E. Gould. A similar sweep circuit 52 is provided to sweep the beam generated in the tube 13 across the lower portion of the metallic strips 32. In one form of operation, the sweep circuit 52 has a frequency which may be represented by the expression $f/k$ where $f$ is the frequency of the sweep circuit 51 and $k$ is a constant. Assuming $k$ is greater than 1, charges are stored for a number of sweeps of the recording beam in the tube 12 and the accumulated charges are removed by the beam in the reproducing tube 13. A circuit wherein the sweep circuits 51 and 52 are of different frequency is shown in Fig. 5. The sweep circuits 51 and 52 may, however, have the same frequency with the time of starting each sweep of the reproducing beam displaced from the time of starting the recording beam. The operation of the tube shown in Fig. 1 will be described in connection with each of these methods of operation in order to show the utility thereof.

Reference will now be made to Fig. 5 which shows a simplified circuit diagram of a radio object locator and distance measuring system employing the tube shown in Fig. 1. The system comprises a suitable transmitter 60 including, by way of example, an oscillator for providing a sine wave having a suitable periodicity which can conveniently be 480 cycles per second but which may be as high as 4,000 cycles per second, if desired. This oscillator energizes a pulse generator of any one of several suitable types well known in the art; for example, see United States Patent 2,117,752, issued May 17, 1938, to L. R. Wrathall, which provides an energy pulse at a particular point of each cycle of the input wave supplied to it. The pulses from the pulse generator are then applied along with the carrier to a modulator of any suitable type. The modulated waves are then applied to the transmitting antenna 61. Waves reflected from one or more objects within the range of the transmitting antenna 61 are received by a receiving antenna 62. The antennas 61 and 62 are of any suitable type; for example, they can be of the polystyrene "polyrod" type disclosed in an application of G. E. Mueller, Serial No. 469,284, filed December 17, 1942, now U. S. Patent 2,425,336, issued August 12, 1947. Connections to the transmitting antenna 61 and from the receiving antenna 62 are made by coaxial cable. The reflected waves picked up by the receiving antenna 62 and also pulse modulated waves from the transmitter are applied to a receiver 63 of any suitable form wherein they are amplified, detected, and applied to the electronic storage tube 10 shown in Fig. 1. The input to the storage tube comprises trains of impulses, that is, for example, one or more pulses accompanied by noise variations. In the specification, the term "noise" will be used to include all types of spurious variations occurring at random times. Preferably, in the receiver 63, noise peaks above the level of the maximum echo pulse are clipped to a level substantially that of the maximum pulse or below this level. Any suitable clipping means can be used.

The output variations from the electronic storage device 10 are applied to one set of plates 64, 64 in any suitable cathode ray oscilloscope 65, a linear sweep circuit 66 being connected to the other set of plates 67, 67. This sweep circuit can be of the type disclosed in the above-mentioned Baldwin patent and it operates, for example, at only a fraction of the frequency of repetition of the pulses formed at the transmitting station 60. In the arrangement shown in Fig. 5, the sweep wave has the same frequency as that of the sweep circuit 52 which is $f/k$. Pulses from the transmitter 60 and having the same rate of repetition as the pulses used to modulate the carrier wave applied to the antenna 61, that is, for example, 480 per second, are applied to the linear sweep circuit 51 to initiate the sweep on the occurrence of each pulse. Each of these last-mentioned pulses is either in phase with the corresponding pulse used to modulate the carrier wave or has some other fixed time relationship with respect thereto. In Fig. 5 the reference character $f$ has been used to designate the frequency of the linear sweep circuit 51. It will be understood that this may be used to refer to the average frequency of the sweep circuit as it will be clear that when the sweep circuit disclosed in the above-mentioned Gould patent is used, each sweep wave is initiated upon the appearance of a pulse in the input circuit thereof and if the pulses are not evenly spaced the starting times of the sweeps are correspondingly unevenly spaced in time. Thus while the transmitter 60 may produce approximately 480 pulses per second on an average basis, each pulse may not be exactly $1/480$ of a second from the immediately preceding pulse or from the immediately following pulse. In the arrangement shown in Fig. 5, this slight variation does not produce any ill effects as the sweep circuit 51 is initiated by the pulses from the transmitter 60 applied to the sweep circuit 51 and the beam in the tube 12 is thus caused to start each sweep across the top portion of the target 14 in phase with, or in fixed out-of-phase relationship to, the occurrence of each pulse used to modulate the carrier wave in the transmitter 60. If, by way of example, the sweep wave produced by the sweep circuit 52 has a frequency of 24 cycles per second there will be twenty sweeps of the recording beam in the tube 12 for every one of the reproducing beam in the tube 13.

The recording beam in the tube 12 is focused into a fine spot on the target 14 by means of the electron lens action of the anodes. This beam is modulated in intensity by the incoming signals from the receiver 63 which are applied between the modulating element 25 and the cathode 15. The modulated beam is caused to move in a transverse direction across the upper portion of each of the strips 32 in turn to cause the formation of negative charges thereon which vary in accordance with the variations in the incoming signals. The charges will be held on the metallic elements 32 because of the condenser action between the elements 32 and the backing plate 30, which is separated from the elements 32 by the layer of insulating material 31. As the echo pulses in the video signal represented by the pulses 81, 82 and 83 in the oscilloscope trace shown in Fig. 6 and the "transmitted pulse," represented by the pulse 80 in that trace, appear in substantially the same time positions in each train of signals (at least for a number of trains), charges laid down on the elemental strips 32, corresponding in position to the position of the echo and transmitted pulses, will accumulate in a direct manner for a period of twenty sweeps, for example. The spurious variations between the pulses, which are called "noise," do not have their peaks appear in the same position in each cycle due to their random nature so the charges on the elemental strips 32 corresponding in position to the position of the noise in the trains accumulate thereon in random phase manner rather than in a direct manner. As mentioned above, the front surface of a portion of the target 14 may be coated with a suitable substance such as carbon to discourage secondary emission so that the laying down of the negative charges is facilitated.

In the tube 13, the beam is focused into a fine spot on the target 14 by the electron lens action of the anodes. This beam is also caused to move in a linear path across each of the elements 32 in turn (but over the lower portion thereof) to remove the negative charges applied to the metallic elements 32 by the recording beam over the previous twenty sweeps. As stated above, the lower portions of the elements 32 may be treated to encourage secondary emission so that the removal of the charges is facilitated. The passage of the secondary electrons to the collecting electrode 48 sets up an output current in the resistor 50. The source 49 biases the collecting electrode 48 with respect to the back plate 30 in order to attract the secondary electrons to the collecting electrode 48. Due to the fact that the pulse produced by the removal of the charge from each element 32 in turn is very much larger than the pulse laid down by the beam 12, it does not make any practical difference whether or not the beam in the tube 12 is contacting an element 32 at the same time as the beam in the tube 13 contacts that element provided, of course, that the frequency of the recording sweep is large compared with that of the reproducing sweep. Each of the sweeps from the circuits 51 and 52 is preferably blanked out on its return trace by means well known in the art, although the return sweep is usually so rapid that the circuit is operative whether or not the sweep is blanked off on its return trace.

Figure 6:
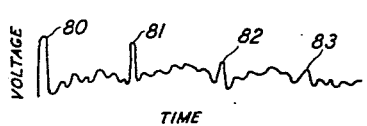
Figs. 6 and 7 are graphical representations to aid in understanding the invention.
Figure 7:
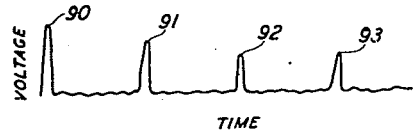

The voltage across the output resistor 50 is applied by means of suitable coupling condensers 53 and 54 to one pair of deflecting plates 64, 64 in the oscilloscope 65, to the other pair of deflecting plates 67, 67 of which is applied the sweep wave from the circuit 66. This sweep wave may be, for example, of the type disclosed in the Gould patent and preferably is of the same average frequency as the sweep circuit 52. The sweep circuit 66 should preferably be synchronized with the circuit 52 and, if desired, the sweep wave from the circuit 52 may be used for deflecting the beam in the tube shown in Fig. 1 and also that in the oscilloscope 65 provided the anode voltage and deflecting distances are similar in the two tubes. By proper means (not shown) but which is similar to the means for synchronizing the line and frame scanning sweep waves in television systems, the start of the sweep wave in the oscilloscope 65 is preferably synchronized with the start of one of the sweeps in the circuit 51. The wave appearing on the screen of the tube 65 is of the type shown in Fig. 7 wherein the pulses 90, 91, 92 and 93 correspond in position to the pulses 80, 81, 82 and 83 of the wave in Fig. 6 but the height of these pulses is accentuated with respect to the noise variations. In Figs. 6 and 7 no attempt has been made to draw the pulses to scale, these voltage variations being merely indicated schematically to illustrate the advantages produced by the circuit of Fig. 5 incorporating the tube shown in Fig. 1. As the over-all width of the frequency band in the output circuit of the tube 10 is less than that in the input circuit thereof, coaxial cables may not be required between the tube 10 and the oscilloscope 65. For example, an ordinary pair of telephone wires may be used.

The tube of Fig. 1 can also be used to record a train or trains of voltage variations applied between the input terminals in Fig. 1 and reproduce the variations at the same rate but each delayed by a certain fixed time. In this respect the operation is similar to that of the tube in the above-mentioned Riesz-Wertz patent. In this arrangement, the sweep circuits 51 and 52 have the same frequency $f$ but each wave in the circuit 52 is started a fixed time after the start of the corresponding sweep wave in the circuit 51. As the output resistor 50 is connected in the circuit between the coating 48 and the backing plate 30 only the output current passes through it. Hence, both beams are preferably kept "on" continuously although, of course, the two beams may be alternately "switched on" in alternate halves of a complete operation cycle, if desired.

Figure 2:
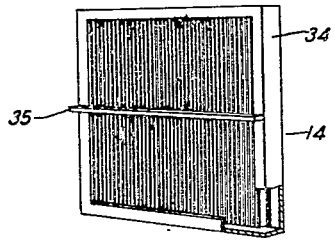
Fig. 2 is an enlarged view of the target of the tube of Fig. 1.
Figure 4:
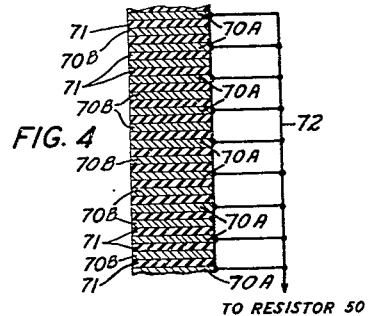
Fig. 4 is a partial cross-section view of a modified target which may be used in the tube of Fig. 1.

A portion of a modified form of target for the tube shown in Fig. 1 is shown in cross-section in Fig. 4. This target comprises alternately positioned metal strips (70A or 70B) and insulating strips 71, the beam approaching the target from the left. Alternate ones of the metal strips (that is, the strips 70A) are connected together by the conductor 72 and connected through the resistor 50 to the negative terminal of the source 49, the positive terminal of which is connected to the coating 48. The strips 70A serve to fulfill the condenser-electrode function of the backing plate of Fig. 1 and also (because of the negative potential thereon) act as a barrier to prevent the migration of secondary electrons from one elemental strip to another. Portions of the strips 70B may be treated, if desired, to encourage secondary emission and the other portions coated to discourage such emission as in the arrangement of Fig. 1. The member 35 may also be used as in Fig. 1. By way of example, it may be fastened to a plastic or other mounting 34 as in the arrangement of Fig. 2. The operation of the tube of Fig. 1 using the target of Fig. 4, except for the difference above noted, is the same as that described above in connection with Fig. 1. In the target of Fig. 4, the capacity between adjacent metal strips 70A and 70B, one of which, 70A is connected to the resistor 50, can be, and preferably is, large, as this corresponds to the capacity between each individual strip and the backing layer in the target of Fig. 1.

It is obvious that the tube of this invention and the circuits employing it can be modified in ways other than those specifically mentioned above and still be within the spirit and scope of the invention, as indicated by the claims.

What is claimed is:

1. An electron beam tube comprising a container enclosing a target comprising an array of spaced conducting strips generally parallel to each other, conductive means spaced a small distance from said strips to form therewith capacity storage means, means for generating a beam of electrons and for sweeping it across corresponding edges of said strips in succession, means on the same side of said target as said first beam generating means for generating a second beam of electrons and for sweeping it across corresponding edges of said strips in succession, said beams sweeping in different portions respectively of said target and each always in the same path, one only of said paths emitting an excess of secondary electrons upon beam impact, a secondary electron collecting electrode positioned nearer said one of said paths than the other of said paths, and a terminal member connected to said conductive means for taking an electrical output signal from said tube.

2. An electron beam tube comprising a container enclosing a target comprising an array of spaced conducting strips generally parallel to each other, conductive means spaced a small distance from said strips to form therewith capacity storage means, means for generating a beam of electrons and for sweeping it across corresponding edges of said strips in succession, means on the same side of said target as said first beam generating means for generating a second beam of electrons and for sweeping it across corresponding edges of said strips in succession, said beams sweeping in different portions respectively of said target and each always in the same path, one only of said paths emitting an excess of secondary electrons upon beam impact, a secondary electron collecting electrode positioned nearer said one of said paths than the other of said paths, and barrier means between said paths tending to prevent secondary electrons from passing from said one path to said edges on the opposite side of said barrier means, said barrier means comprising a shield member of insulating material extending from the target to a position in front thereof in a direction generally perpendicular to the target.

3. An electron beam tube comprising a container enclosing a target comprising an array of spaced conducting strips generally parallel to each other, conductive means spaced a small distance from said strips to form therewith capacity storage means, means for generating a beam of electrons and for sweeping it across corresponding edges of said strips in succession, means on the same side of said target as said first beam generating means for generating a second beam of electrons and for sweeping it across corresponding edges of said strips in succession, said beams sweeping in different portions respectively of said target and each always in the same path, and a terminal member connected to said conductive means for taking an electrical output signal from said tube, said conductive means comprising a second array of spaced conducting strips, each strip in the second array being positioned between two adjacent strips in the first-mentioned array and each being maintained at the same potential as the others in the said second array.

4. An electron discharge device comprising a main chamber enclosing a target comprising an array of metallic members insulated from one another and from a conductive member, a side chamber forming an extension of said main chamber and enclosing an electron gun for generating a beam of electrons, a second side chamber forming another extension of said main chamber and enclosing a second electron gun for generating a second beam of electrons, said guns being positioned so that the electron beams formed thereby strike different portions respectively of the same face of said target, a member of insulating material positioned between said target and said two electron guns and substantially perpendicular to said target for discouraging the passage of electrons from the portion of said target struck by one of said beams to the portion thereof struck by the other of said beams, and a terminal member connected to said conductive member for taking an electrical output signal from said tube.

5. An electron discharge device comprising a main chamber enclosing a target comprising an array of metallic members insulated from one another, a side chamber forming an extension of said main chamber and enclosing an electron gun for generating a beam of electrons, a second side chamber forming another extension of said main chamber and enclosing a second electron gun for generating a second beam of electrons, said guns being positioned so that the electron beams formed thereby strike different portions respectively of the same face of said target, and an electrode for collecting secondary electrons emitted from said target when contacted by one of said beams, said electrode comprising a coating covering a portion only of the walls of said central chamber near the portion of said target contacted by said one of said beams.

6. In combination, a target for electrons comprising a continuous metal backing plate, a layer of insulating material thereon and a multiplicity of alternately arranged insulating and metal strips on said insulating layer, and a secondary emission suppression coating on substantially one-half of each of the metal strips on the surface thereof remote from said insulating layer, an electron gun for generating a first beam of electrons and for contacting therewith in order each of said strips on the coated portion only thereof with said electron beam, and a second electron gun for generating a second beam of electrons and for contacting therewith in order each of said strips on the uncoated portion only thereof with said second beam of electrons.

HUGH S. WERTZ.

REFERENCES CITED

The following references are of record in the file of this patent:

UNITED STATES PATENTS

| Number | Name | Date |
|---|---|---|
| 2,367,277 | Henroteau | Jan. 16, 1935 |
| 2,122,095 | Gabor | June 28, 1938 |
| 2,147,760 | Vance et al. | Feb. 21, 1939 |
| 2,176,599 | Vingerhoets et al. | Oct. 17, 1939 |
| 2,179,205 | Toulon | Nov. 7, 1939 |
| 2,202,376 | Hansell | May 28, 1940 |
| 2,220,688 | Schroter et al. | Nov. 5, 1940 |
| 2,245,364 | Riesz et al. | June 10, 1941 |
| 2,247,350 | Golberg | July 1, 1941 |
| 2,312,792 | Bamford | Mar. 2, 1943 |
| 2,337,578 | Teal | Dec. 28, 1943 |
| 2,339,662 | Teal | Jan. 18, 1944 |
| 2,403,562 | Smith | July 9, 1946 |